United States Patent [19]
Betz

[11] Patent Number: 5,865,294
[45] Date of Patent: Feb. 2, 1999

[54] SCRAPER BLADE WITH A CAVITY TO BLOCK DEBRIS BUILD-UP

[75] Inventor: Frederick W. Betz, Pewee Valley, Ky.

[73] Assignee: Baker-Bohnert Rubber Co., Inc., Louisville, Ky.

[21] Appl. No.: 73,627

[22] Filed: May 6, 1998

[51] Int. Cl.⁶ .................................................. B65G 45/12
[52] U.S. Cl. ........................................................ 198/497
[58] Field of Search .................................... 198/497, 499

[56] References Cited

U.S. PATENT DOCUMENTS

| | | | |
|---|---|---|---|
| 4,489,823 | 12/1984 | Gordon | 198/499 |
| 4,917,231 | 4/1990 | Swinderman | 198/497 |
| 4,953,689 | 9/1990 | Peterson et al. | 198/497 |
| 5,222,589 | 6/1993 | Gordon | 198/497 |
| 5,373,931 | 12/1994 | Barnes et al. | 198/494 |
| 5,413,208 | 5/1995 | Veenhof | 198/497 |
| 5,573,102 | 11/1996 | Puchalla | 198/497 |
| 5,647,476 | 7/1997 | Veenhof | 198/497 |

*Primary Examiner*—James R. Bidwell
*Attorney, Agent, or Firm*—King and Schickli

[57] ABSTRACT

A scraper blade is provided for cleaning debris from a moving conveyor belt. A base of the blade attaches to a holder and an integral blade portion provides a distal edge for scraping. A concave relief cavity having at least one axis of generation extending at an angle to the plane through the blade portion and the edge provides localized vortex action to spin the residual debris and block build-up. As a consequence, solid build-up between the entire blade face and the conveyor belt cannot occur and blade planing is prevented. In an alternative embodiment, multiple cavities are formed on the blade.

6 Claims, 4 Drawing Sheets

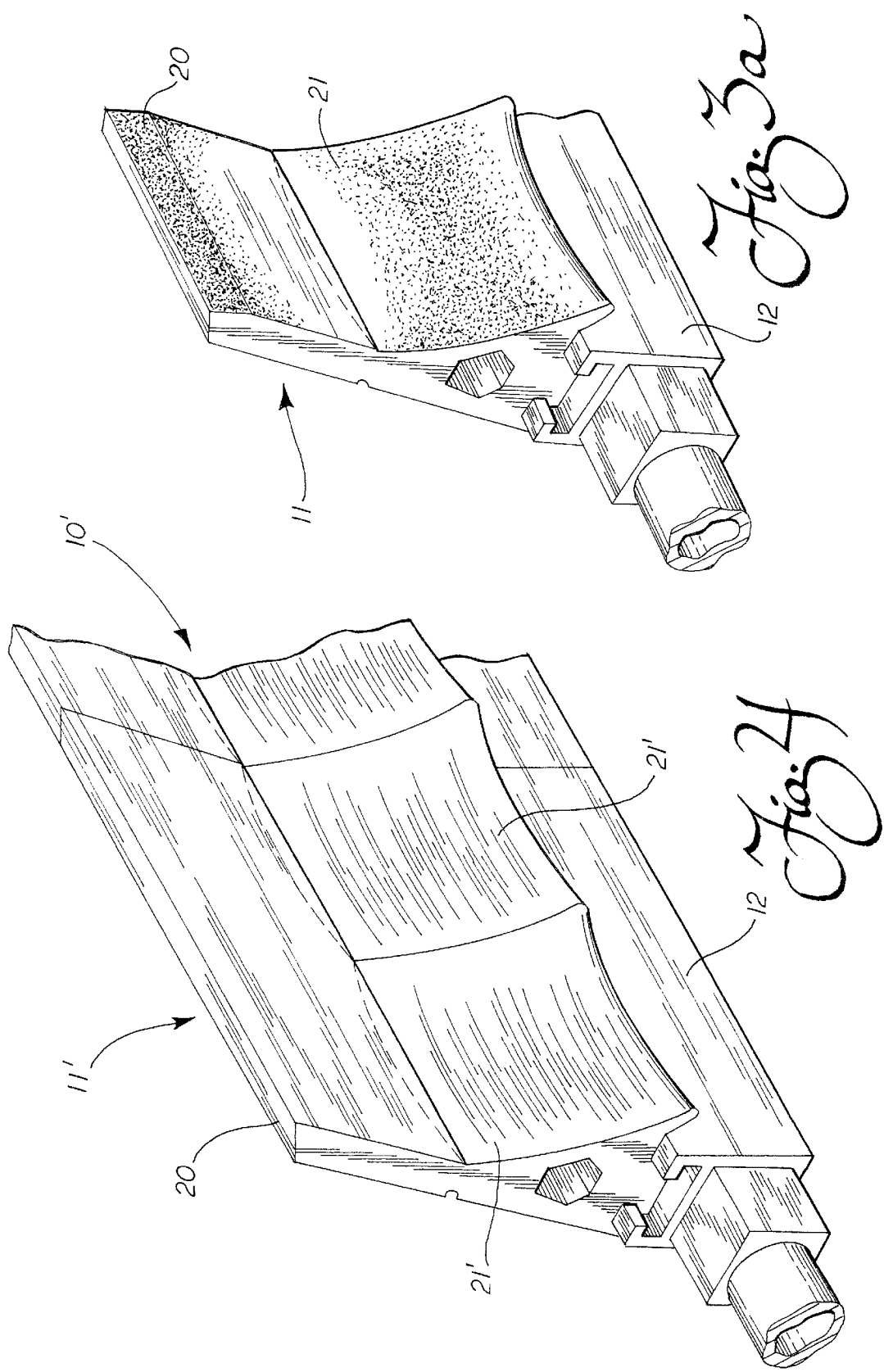

SCRAPER BLADE WITH A CAVITY TO BLOCK DEBRIS BUILD-UP

TECHNICAL FIELD

The present invention relates to conveyor belt systems for conveying aggregate material, such as coal, and more particularly, to a scraper blade for removing debris from the working surface of the belt.

BACKGROUND OF THE INVENTION

In the field of conveying aggregate material, such as coal or other minerals and rock, it is necessary to keep the upper or working surface of the conveyor belt free of debris, such as a build-up of coal dust from the coal being conveyed. Not only is this important in a mining environment, but is also necessary for handling of the coal in a power plant or the like. The problem of debris build-up becomes particularly acute in a situation where there is moisture in the atmosphere. If the debris is not removed, the conveying efficiency is reduced due to the extra weight. This provides a substantial extra burden to the driving motor for the belt pulleys. In some instances, the build-up can disrupt the tracking of the belt and even cause the belt to come off of the pulleys and guide rollers. In this instance, the downtime of the conveyor can cause substantial losses in the mine and/or the power plant.

During recent years, the technology of scraper blades has progressed relatively slowly. A typical blade in use today is molded of urethane rubber and has a generally curved, concave face directed toward and parallel to the surface of the conveyor belt on a pulley. This blade shape has not changed over the past several decades.

One example of a scraper blade having a concave face on the pulley side of a conveyor is the Swinderman U.S. Pat. No. 4,917,231. The emphasis of this blade is to provide a constant angle of attack against the conveyor belt as the distal edge wears. There is no provision for blocking the build-up of debris between the downstream face of the blade on the pulley side and the operative face of the belt. Indeed, experience has shown that debris, especially in wet conditions, does tend to form in this space between the blade and the belt and eventually leads to a build-up sufficient to cause planing of the blade. When this occurs, the distal edge for scraping is forced away from the surface of the belt by the hard packed debris, thus destroying the scraping efficiency.

Other efforts attempting to improve the technology of the scraper blade for a conveyor belt is typified by the Gordon U.S. Pat. No. 5,222,589. In this patent, and in others like it, changes have been made in the transverse holder that provides a mount for the base of the blade. Little change in the efficiency of operation of the blade, particularly in the area of preventing debris build-up, is realized by use of this arrangement. Again, the shape of the blade is provided with a concave face on the pulley side. As is usual, the axis of generation of the concave face is parallel to the belt and the plane extending through the blade and the distal edge for scraping. With this arrangement, as in the arrangement of the '231 patent, there is no localized vortex action that can be generated to block the build-up.

Another area of development of the scraper blade art is characterized by making the blade S-shaped with the base being mounted in a pocket in the transverse holder; see Puchalla, U.S. Pat. No. 5,573,102. While this patent appears to recognize the problem of build-up of dirt or debris, the only modification of the scraper blade to attempt to correct it is to provide protection aprons, both on the pulley side and the back side of the blade. The aprons add substantial expense to the blades and, insofar as is known, do not solve the problem of dirt/debris build-up.

Thus, considering the problem identified and the failure of the prior art to address and solve the problem, what is needed is a new approach to the scraper blade that can be relied upon for high efficiency to block debris build up, as well as being low in cost and easy to manufacture. The blade should be interchangeable with blades that are already on the market. The blade should be constructed so as to provide in all instances localized multi-plane vortex action to prevent build-up sufficient to cause planing of the blade.

SUMMARY OF THE INVENTION

Accordingly, it is one object of the present invention to provide a scraper blade having a construction that overcomes the problem of debris build-up that exists in the prior art.

It is another object of the present invention to provide a scraper blade that provides maximum efficiency of removing debris from a conveyor belt, and at the same time prevents build-up of debris on the entire pulley side of the blade.

It is still another object of the present invention to provide a scraper blade for belt conveyors handling aggregate material, such as coal, that includes one or more relief cavities in the blade, each cavity having at least one axis of generation extending at an angle to a plane through the blade and the scraping edge.

It is still a further object of the present invention to provide a scraper blade wherein the relief cavity is provided on the pulley side of the blade with a shape to generate localized vortex action, thereby causing a spinning of the residual debris sufficient to block debris build-up on the entire blade and blade planing during operation.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To carry out the foregoing objectives and others, a scraper blade is provided for cleaning debris from a moving conveyor belt, such as for handling aggregate coal. A concave relief cavity provides a mechanism for minimizing debris build-up on the entire blade, including the straight upper blade portion, so as to prevent deleterious planing of the blade and interruption of the scraping function. The blade is mounted on a holder that extends transversely and in parallel relationship across the belt. While the preferred embodiment shown in the drawings is particularly adapted to scrape debris from a conveyor belt and thus keep it clean during operation, it is to be understood that other uses can be made, such as scraping a pulley, drum or other surface. Also, while the particular material being moved by the conveyor belt is described as being aggregate coal, within the broader aspects of the present invention other types of material can present similar problems of build-up and the scraper blade of the present invention can be useful in preventing debris build-up in those instances.

The scraper blade includes a base for attachment by any suitable means to any conventional holder. In the manner taught by the prior art, the holder is typically a tube with the longitudinal axis extending transversely across the belt in a parallel fashion. The base of the scraper blade is grooved to mate with a bracket on the tube forming the holder. The holder is adjusted so that the scraper blade is rotated and constantly biased into engagement with the operative face of the conveyor belt.

Integral with the base is a blade portion that has a distal edge to engage the belt for scraping. A scraping angle is defined by a plane extending through the blade portion and the edge. According to the present invention, a concave relief cavity is formed in the blade and has at least one axis of generation extending at an angle to this plane. This relief cavity, oriented in this way is in effect positioned 90° from the typical parallel orientation of the curved blade of the prior art, as shown in the prior art patents mentioned above. As a result, the boundary layer air flow established by the relative belt movement generates localized vortex action to spin the residual debris and block it from becoming trapped between the belt and the pulley or downstream side of the blade. The debris spins in a spiral, or multi-plane vortex, and because of this action it is effective to block debris build-up. When the build-up is prevented, the entire scraper blade, including the upper blade portion, is free to continue moving toward the belt and working, without the possibility of planing and thus loosing scraping efficiency.

Preferably, the cavity is defined as a segment of a cylinder. However, within the broader aspects of the present invention, other particular shapes can be employed, such as a segment of a sphere, or any variation in between. In either case, the axis of generation of the face of the blade to form the cavity substantially defines the center of the multi-plane vortex action. Advantageously, this axis is substantially parallel to the tangent of the operative face of the belt.

In the preferred embodiment, the cavity is formed in the base and the face of the blade portion toward the conveyor belt is generally flat. Also the blade is positioned so that during biased rotation for adjustment during wear, the angle with respect to the face of the belt varies continuously. In a typical installation, a plurality of blades are positioned along the blade holder to form one continuous blade assembly for scraping across the full width of a conveyor belt. As will be realized, the multiple cavities formed by the multiple blades thus form a scalloped blade assembly. In operation, the multiple concave relief cavities formed by the blades of the blade assembly, and in combination with the straight blade portions, form a plurality of localized vortices across the width of the conveyor belt, thus providing maximum efficiency in blocking or prevention of debris build-up at any point. For heavy duty scraper blades, multiple cavities can be formed in the blade itself.

In the preferred manner of positioning the scraper blade against a conveyor belt, the distal scraping edge engages the belt at approximately the vertical midpoint of the support pulley. In this instance, the axis of generation of the relief cavity is extending generally in the vertical direction providing increased ease of removal of the debris by gravity as it spins by multi-plane vortex action.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrates several aspects of the present invention and together with the description serves to explain the principles of the invention. In the drawings:

FIG. 2a is a side view of the scraper blade of the present invention in engagement with the operative face of the conveyor belt and illustrating the variable scraping angle, as well as the angle of the axis of generation for the concave relief cavity with respect to the plane of the blade;

FIG. 3a is a perspective view of the scraper blade similar to FIG. 2 illustrating the manner in which debris build-up is prevented; and FIG. 4 is a perspective view of a heavy duty blade illustrating an alternative construction with side-by-side integral relief cavities on the single blade, and with a portion of the entire blade assembly being broken away.

Reference will now be made in detail to the present preferred embodiment of the invention, an example of which is illustrated in the accompanying drawings.

DETAILED DESCRIPTION OF THE PREFERRED EMBODIMENT

Figure 1:
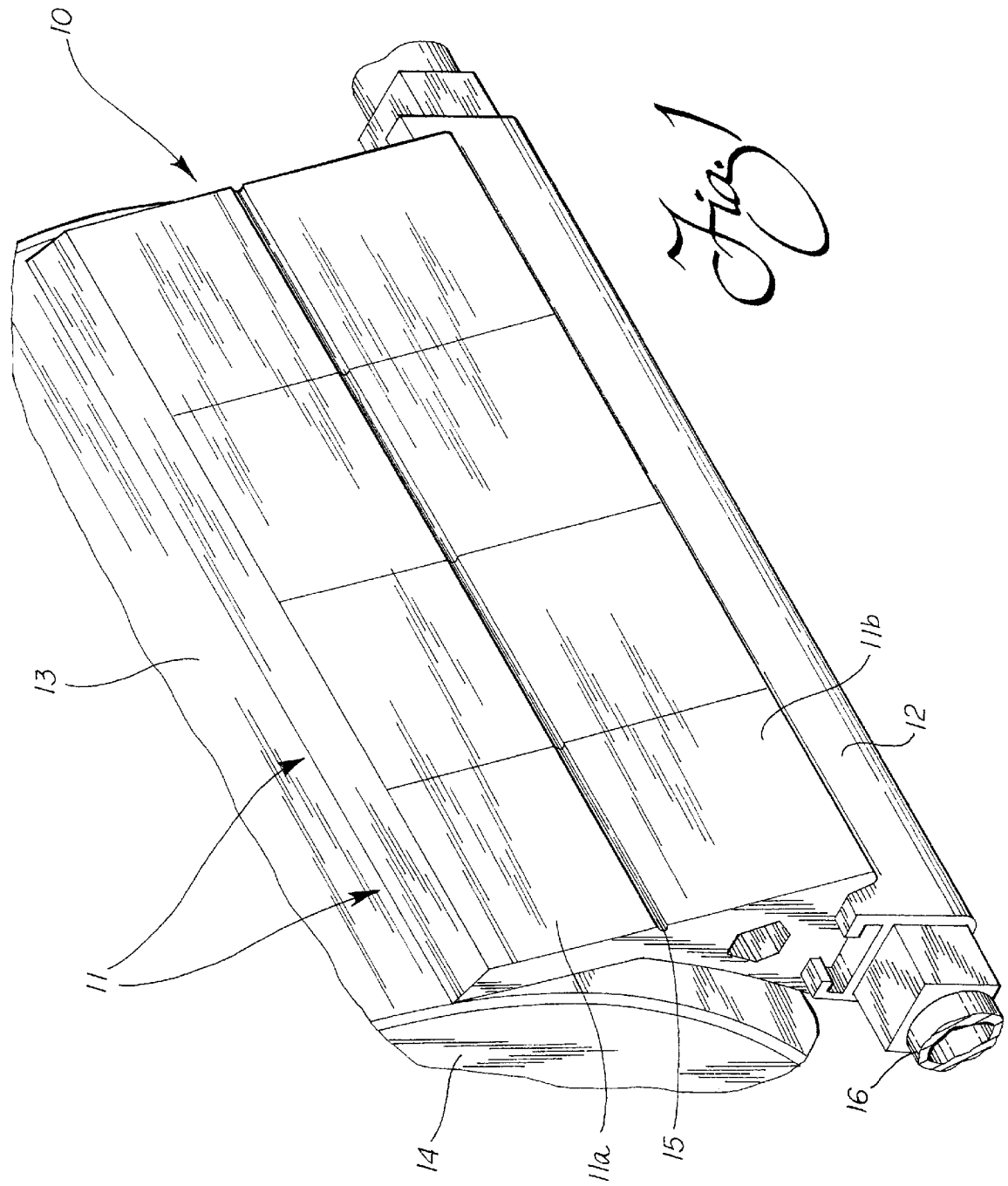
FIG. 1 is a perspective view of a blade assembly made up of a plurality of scraper blades with the distal, scraper edge engaging the face of a conveyor belt positioned on a pulley; the blades being mounted on a holder extending transversely and parallel to the pulley and the belt.

With reference now to FIG. 1 of the drawings, a preferred embodiment of the present invention is shown in a typical application. Specifically, a scraper blade assembly 10, comprised of a plurality of scraper blades 11, is mounted on a holder 12 that extends transversely across and parallel to a conveyor belt 13 that is being scraped. In a typical fashion, the belt 13 is trained around a pulley 14, with the blade assembly 10 being positioned so as to scrape along approximately the vertical midpoint of the pulley 14. Each blade 11 includes a blade portion 11a and a base portion 11b, which are generally divided by an indent line 15. The base 11b is shown with a grooved lower face for mounting on a bracket carried by an elongated tube 16, the combination of which forms the holder 12 in a typical fashion. As will be realized, the number of scraper blades 11 are mounted on the holder 12 in order to cover the full width of the conveyor belt 13. As is known in the art, the scraper blades 11 are molded of a urethane rubber compound. This has been found through experience to give just the right amount of stiffness for scraping, coupled with needed resiliency to allow variation in the thickness of the belt and to traverse joints in the belt. Characteristics of wear are also favorable utilizing this compound.

Figure 2:
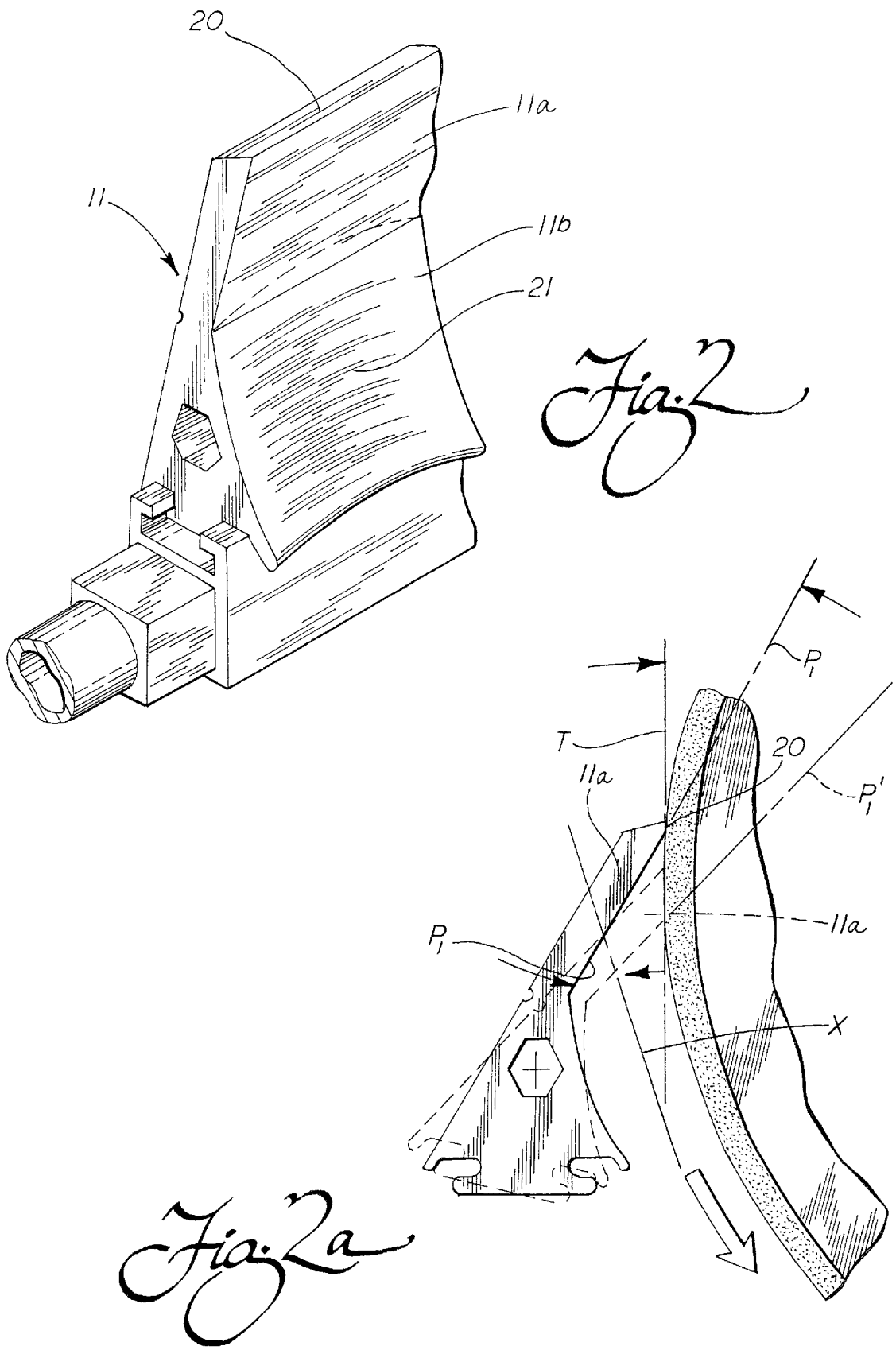
FIG. 2 is a cut away perspective view of a single blade illustrating the pulley side of the blade featuring a concave relief cavity on the base of the blade.

By viewing FIG. 2, the operative side of the scraper blade can be seen in detail. The blade portion 11a is generally flat along this side and the upper distal edge 20 forms the initial scraping edge to remove the debris from the belt 13 (see FIG. 2a).

According to the invention, the face of the base 11b has a concave relief cavity (see FIG. 2) formed in it during molding. From the appearance provided in FIG. 2, it can be seen that the basic shape of the relief cavity 21 is broadly a segment of a cylinder; however, within the broader aspects of the present invention, the cavity can take on the shape of a sphere, or any variation between the two.

As illustrated best in FIG. 2a, a plane $P_1$ extends along the face of the blade portion 11a and through the distal scraping edge 20. During operation, the blade portion 11a wears, as illustrated by the dashed line outline in this figure. Note the position of the plane $P_1'$ at the typical maximum wear position. The scraping angle formed between the tangent T and the operative planes $P_1$ and $P_1'$ of the face of the conveyor belt 13 is typically in the range of 15°–60°, as generally illustrated.

Figure 3:
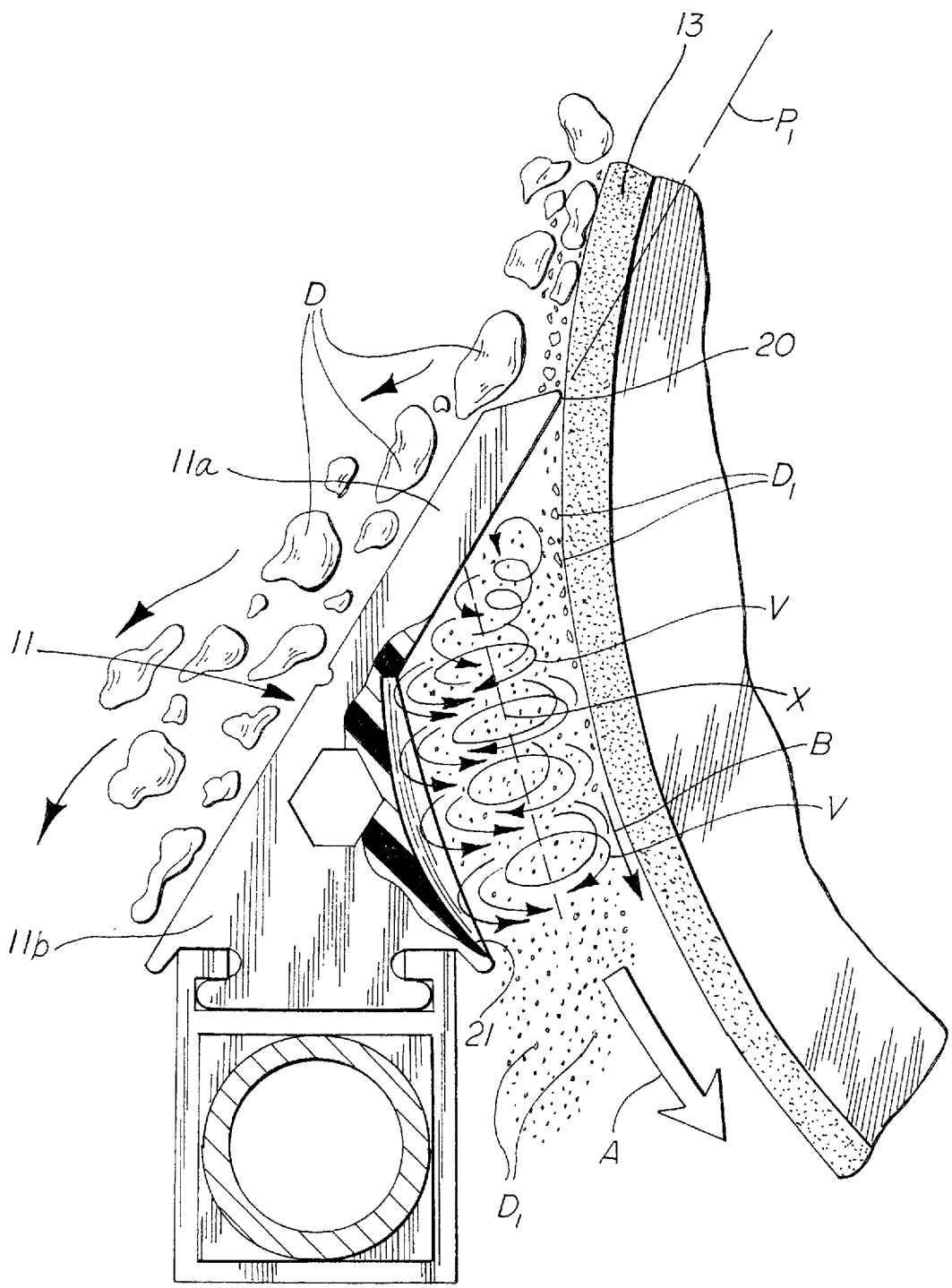
FIG. 3 is an enlarged side view similar to FIG. 2a and with a portion of the base of the blade being cut away in cross section to show the relief cavity and illustrating in detail the scraping action, as well as the multi-plane vortex action to prevent debris build-up and blade planing.

With reference now to FIG. 3 of the drawings, a typical operation of the blade 11 to remove coal debris from the belt 13 is illustrated. Assuming that the belt 13 is moving in the direction of action arrow A, the large debris D is scraped from the operative surface and falls along the outer side of the blade 11. In the process, it is inevitable that fine, granular dust $D_1$ is able to escape under the scraping edge 20 and around the ends, and thus end up adjacent the pulley side of the blade 11. The concave relief cavity 21 is preferably formed by generating a segment of a cylinder about axis X, as shown in this figure. This cavity is effective to induce multi-plane vortex or spiraling action V induced primarily from boundary layer air flow B. The multiple plane action is illustrated in the form of tilted, spiral flow generally along the generation axis X. The downward movement of the boundary layer flow B coupled with the surface of the straight blade portion 11a and the concave shape of the cavity to induce spiral action has a very beneficial effect in scrubbing the debris dust $D_1$ from the operative face of the conveyor belt 13, as well as from the entire face of both the straight blade portion 11a and the base portion 11b. In effect, this vortex action is localized along the transverse length of the belt and by causing this residue debris to spin in the active, multi-plane pattern shown, the tendency is to block debris build-up. Once the build-up is blocked or prevented from occurring, there can be no solid layer of debris formed between the blade and the conveyor belt and as a result the scraping edge 20 continues to move inwardly and is maintained in firm operative contact with the belt 13.

By viewing FIG. 3a, the result of the blocking action can be more fully understood. The illustration is from an actual test that shows only a minimum staining of the relief cavity 21, and actually no appreciable build-up of debris dust on the entire blade 11. In addition to along the cavity 21, there is simply some staining along the worn scraping edge 20 at the top of the blade portion 11. However, it will be realized that there is no build-up sufficient to form a mass of debris between the face of the blade 11 and the operative face of the conveyor belt 13 to prevent the belt from maintaining pressure at the scraper edge 20. As the wearing of the edge 20 continues during operation, the blade 11 is free to continue to rotate due to the spring action on the holder 12 and press the edge 20 against the belt 13. The blade is not stopped by build-up of debris jamming between the face of the blade 11 and the operative face of the belt 13, as has been a problem in the past.

To describe more in detail the operation of the scraper blade 11 and the manner in which the air flow action across the straight blade portion 11a and the concave relief cavity 21 is provided, reference is made back to FIG. 3. The boundary layer air flow B is transformed into the multi-plane vortex flow V, and the resulting maximum turbulence and spiraling flow under these conditions advantageously discharges the residual debris dust $D_1$ out through the bottom of the space between the blade 11 and the conveyor belt 13. This is localized vortex action. Thus, a number of vortices, such as four in FIG. 1, can be spaced across the width of the conveyor belt 13. This localization of the vortex action assures that the maximum dust particle movement is maintained, thus actively blocking any substantial tendency for debris build-up and planing of the blade 11. As mentioned above, the axis X of generation of the cavity 21 is positioned at an angle to the plane $P_1$ extending through the blade portion 11a and the scraper edge 20 (see FIG. 2a also), rather than parallel along the length of the blade as in the prior art.

An alternative embodiment is illustrated in FIG. 4 of the drawings. In this instance, multiple concave relief cavities 21' are formed in a single heavy duty blade 11'. As will be realized, multiple heavy duty blades 11' are combined on a single holder 12 to form a blade assembly 10'. The same beneficial multi-plane vortex action occurs as with the embodiment of FIGS. 1–3 and the build-up of debris between the blade 11' and the conveyor belt 13 is prevented in the same manner.

From the foregoing description of the present invention, the advantageous results of the scraper blade 11, 11' of the present invention can now be fully realized. A concave relief cavity 21, 21' is formed on the face of the blade with at least one axis X of generation extending at an angle to the plane $P_1$ passing through the blade and the scraper edge 20. A more efficient blocking action against debris build-up is provided from that of the prior art that utilizes a continuous concave face extending parallel to the blade, rather than at an angle. The boundary layer air flow, illustrated by the arrow B, initiates the turbulence and multi-plane vortex V along the axis X opposite both the straight blade portion and the relief cavity. From actual testing, essentially no build-up occurs, and even the staining along the entire operative face of the blade 11, 11' is minimized. In the heavy duty embodiment, a plurality of cavities 21' can be utilized.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. A scraper blade for cleaning debris from a moving conveyor belt or the like, and adapted for mounting on a holder extending transversely across said belt; comprising:

a base for attachment to said holder;

a blade portion on said base and having a distal edge to engage said belt for scraping;

a plane extending through at least said blade portion and said edge to define a scraping angle; and a concave relief cavity in said blade having at least one axis of generation extending at an angle to said plane, whereby upon establishing relative belt movement, a boundary layer air flow established by said belt generates localized vortex action to spin the residual debris and block debris build-up and blade planing.

2. The scraper blade of claim 1, wherein the cavity substantially defines a segment of a cylinder.

3. The scraper blade of claim 2, wherein the axis of generation substantially defines the center of said vortex action and is substantially parallel to said belt in the direction of movement.

4. The scraper blade of claim 1, wherein said cavity is formed in said base.

5. The scraper blade of claim 1, wherein is provided multiple cavities formed in said blade extending across said belt to form a scalloped blade.

6. The scraper blade of claim 1, wherein said belt is mounted on a pulley, said distal edge engaging said belt at approximately the vertical midpoint, said one axis extending generally in the vertical direction, whereby the debris removed from the belt falls free by gravity as it spins by vortex action.

\* \* \* \* \*